(12) United States Patent
Hanahata et al.

(10) Patent No.: US 6,245,876 B1
(45) Date of Patent: Jun. 12, 2001

(54) CONTINUOUS MOLDED ARTICLE FOR POLYURETHANEUREA AND PRODUCTION METHOD THEREOF

(75) Inventors: Hiroyuki Hanahata, Ohtsu; Yoshihiko Shimaya, Oumihachiman, both of (JP)

(73) Assignee: Asahi Kasei Kogyo Kabushiki Kaisha, Osaka (JP)

( * ) Notice: Subject to any disclaimer, the term of this patent is extended or adjusted under 35 U.S.C. 154(b) by 0 days.

(21) Appl. No.: 09/380,280

(22) PCT Filed: Feb. 27, 1998

(86) PCT No.: PCT/JP98/00832
  § 371 Date: Aug. 27, 1999
  § 102(e) Date: Aug. 27, 1999

(87) PCT Pub. No.: WO98/38364
  PCT Pub. Date: Sep. 3, 1998

(30) Foreign Application Priority Data

Feb. 27, 1997 (JP) .................................... 9-043141
Mar. 13, 1997 (JP) .................................... 9-059538

(51) Int. Cl.[7] .................................................. C08G 18/32
(52) U.S. Cl. ...................... 528/61; 264/177.18; 264/180; 264/181; 264/184; 528/68
(58) Field of Search .............................. 264/177.18, 180, 264/181, 184; 528/61, 68

(56) References Cited

U.S. PATENT DOCUMENTS

| 2,929,804 | 3/1960 | Steuber | 528/61 |
|---|---|---|---|
| 2,988,802 | * 6/1961 | Tonomari et al. | 264/181 |
| 3,009,764 | 11/1961 | Urs . | |
| 3,111,369 | * 11/1963 | Gregg et al. | 264/181 |
| 3,115,384 | 12/1963 | Cacella | 264/184 |
| 3,387,071 | 6/1968 | Cahill | 264/184 |
| 4,898,704 | * 2/1990 | Luckey | 264/180 |

FOREIGN PATENT DOCUMENTS

| 533954 | 5/1998 | (EP) . |
|---|---|---|
| 1061094 | 3/1967 | (GB) . |
| 1103565 | 2/1968 | (GB) . |
| 3213515 | 9/1991 | (JP) . |
| 155841 | 6/1993 | (JP) . |
| 5186557 | 7/1993 | (JP) . |
| 7150417 | 6/1995 | (JP) . |

* cited by examiner

Primary Examiner—James J. Seidleck
Assistant Examiner—Melanie D. Bagwell
(74) Attorney, Agent, or Firm—Birch, Stewart, Kolasch & Birch, LLP

(57) ABSTRACT

The present invention relates to a continuous shaped article such as a polyurethaneurea fiber and a polyurethaneurea film having a birefringence index ($\Delta n$) of from at least $1.0 \times 10^{-4}$ to $8.0 \times 10^{-4}$ in a nontensile state, a crosslinking density at an elongation of 100% (N100) of at least $5.0 \times 10^{26}/m^3$, a crosslinking point density at an elongation of 400% (N400) of from $4.0 \times 10^{26}$ to $3.0 \times 10^{27}/m^3$, and a crosslinking point density at the time of breakage (Nt) of at least $1.6 \times 10^{27}/m^3$, wherein the ratio of the crosslinking density at an elongation of 400% to that at an elongation of 100% (N400/N100) is from 0.9 to 1.3, and a process for producing the same. The present invention has made the continuous shaped article show an initial stress, a strength at break and an elongation at break which are sufficiently high, and a small rise in the stress in the medium elongation range.

6 Claims, 3 Drawing Sheets

CONTINUOUS MOLDED ARTICLE FOR POLYURETHANEUREA AND PRODUCTION METHOD THEREOF

This application is the national phase under 35 U.S.C. §371 of PCT International Application No. PCT/JP98/00832 which has an International filing date of Feb. 27, 1999 which designated the United States of America.

1. Technical Field

The present invention relates to a polyurethaneurea (hereinafter referred to as PUU) continuous shaped article having excellent characteristics such as a segmented PUU fiber and a segmented PUU tape, and a process for producing the same. The present invention relates in more detail to a PUU continuous shaped article having a high initial stress, a high elongation and a high strength as compared with conventionally obtained polyurehtaneurea continuous shaped articles. Moreover, the present invention relates to an improved process for producing a PUU continuous shaped material suited to the production of a PUU continuous shaped article having a small thickness (film-like for a tape, etc.) at a high rate.

2. Background Art

Polyurethane has been used for a wide range of applications such as foams, adhesives, paints, elastomers, synthetic leathers and fibers, and many useful products have been produced therefrom.

Of the materials as mentioned above, the elastic PUU fiber required to have a particularly high elasticity has been used for a wide range of applications such as an alternate material for rubber in the stretch portions of pantihose, foundation garments, stockings, paper diapers which have been recently put into practice, etc.

The production processes PUU fibers include a dry spinning process, a wet spinning process and a reaction spinning process. Commercially available spandexes obtained by these processes are classified into the following two types.

(1) A spandex which shows a relatively high stress (initial stress, 0.06 to 0.09 g/d) when elongated by 100% and a high strength at break (at least 1.0 g/d), but which shows no significantly large elongation at break (500 to 700%), and a sharp rise in the stress when elongated by about 400%. When consumers wear such a type of fiber products (elastic PUU fiber obtained by dry or wet spinning), they have an excessively tightening feel.

(2) A spandex which shows a low initial stress (up to 0.05 g/d), a strength at break from about 0.5 to 1.0 g/d and a high elongation at break (at least 700%), but which shows no sharp rise in the stress. When consumers wear such a type of fiber products (elastic PUU fiber obtained by reaction spinning), there is no tightening feeling, and the feel is agreeable.

The low initial stress and the sharp increase in the stress at the time when the fiber is elongated by 400% as mentioned in (1) are not necessarily desirable for the elastic PUU fiber. An elastic PUU fiber having really desirable characteristics has not been developed yet.

Next, problems of the conventional production process of PUU continuous shaped articles will be explained below by taking an elastic PUU fiber as an instance. A polyurethaneurea solution (dope) for spinning which can be used for dry spinning and wet spinning is generally obtained by the two-stage process. That is, a diisocyanate component and a diol component are reacted in a molten state as a first stage to give a molten prepolymer having isocyanate groups at the molecular ends, which is dissolved in a solvent such as N,N-dimethylacetamide or N,N-dimethylformamide to give a solution of the prepolymer (hereinafter abbreviated to PUP) (melting synthesis process). Alternately, both components are directly reacted in such a solvent as mentioned above to give a prepolymer solution (solution synthesis process). In a second step, the prepolymer is polymerized (chain extension) with a aliphatic diamine as disclosed in the specification of U.S. Pat. No. 2,929,804 to give a polyurethaneurea solution. An elastic PUU fiber is shaped by evaporating the solvent from the solution within a heated spinning cylinder in dry spinning, or by coagulating the fiber in a coagulating bath in wet spinning.

However, production of an elastic PUU fiber having a thickness (size) larger than 10 denier at an economical spinning speed is difficult because the rate of removing solvent from the polymer solution is slow in these processes. Accordingly, multifilaments must be produced, the production of which is technologically more difficult, when a PUU fiber having a thickness larger than 10 denier is desired. Conversely, an elastic PUU fiber having a thickness smaller than 10 denier, the demand of which is sharply increasing recently due to the recent tendency toward making the products lightweight, is also difficult because of the air resistance and solution resistance.

On the other hand, the reaction spinning process is a simple one and comprises preparing a PUP by a melting synthesis method containing no solvent or containing a solvent in an extremely slight amount, and directly producing polyurethaneurea in a reaction solution containing a polyamine and simultaneously shaping a filament material. Moreover, the process has an excellent advantage that the composition of the PUU can be widely selected, which advantage is practically difficult to obtain from the other spinning processes. As explained above, in the dry spinning process, the polymer must be soluble in a solvent. As a result, the polymer composition is restricted. On the other hand, in the reaction spinning process, a prepolymer is directly formed into a polymer without dissolving the prepolymer in a solvent; therefore there is no such a restriction. The reaction spinning process potentialy provides weathering resistance, yellowing resistance and chlorine resistance of the elastic PUU fiber, which have been said to be its drawbacks, by greatly changing its chemical structure.

The specifications of U.S. Pat. Nos. 3,115,384 and 3,387,071 disclose examples of the reaction spinning process. U.S. Pat. No. 3,387,071 discloses a process comprising synthesizing a prepolymer by melting synthesis, directly extruding the molten prepolymer into a solution of a diamine which is a chain extender, and winding the filament polyurethaneurea thus obtained.

However, the elastic PUU fiber obtained by the conventional reaction spinning process has problems as explained below:

(1) First, increasing the spinning speed is difficult due to a large reaction bath solution resistance for reasons as explained below. Since the polyamine bath is substantially stationary in the conventional technology, the PUU filament material in the course of shaping suffers a markedly large solution resistance to have poor physical properties and is finally broken when the take-up speed (withdrawal speed) exceeds a certain level. For a yarn having a thickness of about 100 denier, the process can only ensure a spinning speed as low as about 60 to 70 m/min. The dry spinning process can ensure a spinning speed as high as 500 to 1,000 m/min.

(2) Second, production at an economical production rate of an elastic PUU fiber having a thickness as small as up to 50 denier, the demand of which is great, is difficult because of the solution resistance in the reaction bath.

(3) Third, an elastic PUU fiber produced by the conventional reaction spinning process shows a high elongation at break, but it shows an extremely low initial stress (which is approximately half of that of the elastic PUU fiber produced by dry spinning) to lower the product quality. For reasons as mentioned in (3) and for reasons of difficulty in producing the elastic PUU fiber having a small fineness as mentioned in (2), the applications of the elastic PUU fiber produced by the conventional reaction spinning process have been restricted.

When an elastic PUU fiber is to be processed, the fiber is fed without slack while the fiber is being stretched to have a given elongation (from about 100 to 200%) by applying a predetermined stretch tension, and formed into a fabric. However, since the stress corresponding to the elongation imparted to the fiber during the processing is not sufficiently high, a slight variation of the tension during processing results in slackening of the elastic PUU fiber, or it is conversely tightened by the reaction force. The fiber thus comes to have an irregular variation in the elongation. Consequently, the elongation of the elastic PUU fiber in the fabric texture varies depending on the local site thereof, and there arises a problem that the variation is manifested as unevenness of the fabric quality (hereinafter referred to as process unevenness). The initial stress is important for the elastic PUU fiber due to the phenomenon as mentioned above. A minimum stress necessary for improving the problem is at least from 0.06 to 0.07 g/d when the elastic PUU fiber is elongated by 100%.

Procedures such as mentioned below have been proposed for improving the initial stress in the chemical reaction spinning process: a procedure including changing the polymer composition; a procedure including adjusting the length of the soft and hard segments; and a procedure including introducing chemical crosslinking. However, satisfactory results have not been obtained.

Although the reaction spinning process has potentially excellent characteristics as described above, the problems (1) to (3) as mentioned above related to the properties, thickness, productivity, etc. have not been improved. That is, no progress subsequent to the reaction spinning process including the process disclosed in the U.S. Patents mentioned above has been reported.

The present invention solves the problems (1) to (3) mentioned above which the conventional reaction spinning process has, and provides a PUU fiber, a PUU tape, etc. showing a high initial stress, and a strength at break and a elongation at break which satisfy the practical performances of the fiber, tape, etc. The present invention provides at the same time a novel reaction shaping technology which produces at a high production rate continuous shaped articles having various sizes for fibers and various thicknesses for tapes.

DISCLOSURE OF THE INVENTION

The present invention relates to a polyurethaneurea continuous shaped article having a birefringence index ($\Delta n$) of from at least $1.0 \times 10^{-4}$ to $8.0 \times 10^{-4}$ in a nontensile state, a crosslinking density at an elongation of 100% (N100) of at least $5.0 \times 10^{26}/m^3$, a crosslinking density at an elongation of 400% (N400) of from $4.0 \times 10^{26}$ to $3.0 \times 10^{27}/m^3$, and a crosslinking point density at the time of fracture (Nt) of at least $1.6 \times 10^{27}/m^3$, wherein the ratio of the crosslinking density at an elongation of 400% to that at an elongation of 100% (N400/N100) is from 0.9 to 1.3, and a process for producing a polyurethaneurea continuous shaped article comprising extruding from a shaping nozzle a liquid polyurethane prepolymer having isocyanate groups at at least two molecular ends at an extrusion line speed of Ls, introducing the extruded polyurethane prepolymer into a flowing bath composed of a polyamine-containing reaction solution flowing at an average flowing speed Vf in the traveling direction thereof under the condition of $Ls \leq Vf$, whereby the chain of the polyurethane prepolymer is extended by the reaction of the isocyanate groups with the polyamine in the flowing bath and a solidified polyurethaneurea is produced, and taking up the polyurethaneurea at a speed of Vt which is at least Vf.

Since the PUU continuous shaped of the present invention is a small shaped article having an initial stress, a strength at break and a elongation at break which are sufficiently large, and a small rise in the stress in a medium elongation range, it can provide a fabric having decreased processing irregularity, and products exhibit excellent fittingness free of excessive tightnening feel during wearing.

The process of the present invention has made it possible to produce PUU continuous shaped articles having finenesses in a wide range which are difficult to produce, even the conventional reaction spinning and the dry spinning process, at a high spinning speed comparable to that of dry spinning. Moreover, the process of the present invention has made it possible to produce PUU continuous materials having various compositions which are difficult to produce in the dry spinning and the wet spinning processer; therefore, the process has an extremely high industrial value.

BEST MODE FOR CARRYING OUT THE INVENTION

Examples of the continuous shaped article of the present invention include a fiber and a film. The present invention will be explained below by taking a fiber as an example. The present invention is similarly applied to other continuous shaped articles such as a film.

The elastic PUU fiber is a block copolymer comprising soft segments manifesting elasticity and hard segments functioning as crosslinking points, and formed from an amorphous polymer having an amorphous amount of at least 85% by weight. Accordingly, the elastic PUU fiber shows a low stress in the low elongation region prior to manifesting entropy elasticity by applying a tension thereto to deform it greatly.

In the classic theory of rubber elasticity, a stress ($\sigma$) at an elongation ratio ($\lambda$) can be determined from a crosslinking density (N, dimension of $m^{-3}$) as shown by the formula (1). The crosslinking point density is the number of crosslinks dispersed in a unit volume of the elastic PUU fiber.

$$\sigma = NkT(\lambda^2 - 1/\lambda) \qquad (1)$$

wherein k is a Boltzmann's constant, T is a temperature at which measurements are made, and the stress $\sigma$ is shown by a value obtained by dividing the tenacity at the time when the elongation ratio is $\lambda$ by the cross-sectional area at the time of elongation (dimension of $N/m^2$). The elongation ratio λ is, for example, 2 when the elongation is 100%. The cross-sectional area of the PUU fiber at a certain elongation is determined by assuming that the fiber shows a Poisson deformation. For example, the cross-sectional areas of the fiber at respective elongations of 100 and 400% are a half and one fourth of that of the fiber suffering no elongation, respectively.

In the specification of the present invention, the stress (initial stress) at the time when the PUU fiber is elongated by 100% and the strength at break are expressed by values obtained by dividing the stresses (TS) under respective conditions by the initial cross-sectional area, similarly to a general fiber strength. There is the following relationship between TS and:

$$TS = \sigma A_0/(D \cdot \lambda) = (A_0 NkT/D) \cdot (\lambda - 1/\lambda^2) \quad (2)$$

wherein $A_0$ is a cross-sectional area in a nontensile state, and D is a fineness (in terms of denier).

Although a change in a crosslinking density in accordance with an elongation has not been sufficiently clarified scientifically, the crosslinking density is thought to be the sum of hard segment crosslinks ($N_{hard}$), pseudo-crosslinks ($N_{crystal}$) formed by orientation crystallization of soft segments which is caused by elongation and crosslinking ($N_{entangl}$) formed by formation of entangled points of segment chains. Accordingly, the crosslinking point density (N) at an arbitrary elongation can be represented by the formula $$N = N_{hard} + N_{crystal} + N_{entangl} \quad (3)$$

In the present invention, an elongation test is conducted at 20° C. at an elongation rate of 1,000%/min with an initial length of 50 mm; from the measured values of the stress at elongations of 100% and 400% and at the elongation ratio at the time of breakage and from the respective cross-sectional areas of the fiber, the crosslinking point density at an elongation of 100% (N100), the one at an elongation of 400% (N400) and the one at rupture (Nt) are obtained from the formula (1). Nt is not necessarily proportional to the strength at break obtained from the formula (2). For example, as seen from comparison of Example 6 and Comparative Example 2 to be described later, there can be a case where an elastic PUU fiber in Comparative Example 2 has higher Nt than one in Example 6 although the PUU fiber in Example 6 has a higher strength at break and a higher elongation at break.

The structural features of the PUU fiber of the present invention will be shown below, and it will be shown that the features can be defined by the crosslinking point density (N).

In the present invention, a PUP reacts with a polyamine to form a polyurethaneurea (PUU) having a high molecular weight and is made fibrous simultaneously so that a PUU fiber is formed, as will be described later. When a polyamine solution is transferred at a higher speed than the PUP, the PUP molecular chain is in a temporarily oriented (flow oriented) state; however, it is readily relaxed because the PUP has a low molecular weight. As a result, the thus produced PUU fiber shows a low birefringence index. Of the relaxed molecular chains, urea-bonded portions, which mutually act each other significantly, form domains (hard segment block), and the domains act as crosslinks. The PUP appropriately used in the present invention is a viscous material containing no solvent or containing a solvent in an extremely slight amount. The urea-bonded molecular chains thus formed by the reaction therefore have poor dispersibility and the growth is hindered. As a result, a hard segment block in which urea-bonded portions are agglomerated is formed. In addition to the hard segment block, a so-called 'hard-soft' block in which the urea-bonded portions of the hard segment block form different bonding with urethane groups in a greatly excessive number of soft segments surrounding the hard segment block is thought to be formed. When tension caused by a flow orientation is applied during the formation of the two blocks, a suitable dispersion takes place in the longitudinal direction of the filament because the bonding force of each of the blocks is not yet sufficient, resulting in an increase in the crosslinking point density ($N_{hard}$) Since the crosslinking point density of the PUU fiber of the present invention at an elongation of 100% (N100) is substantially equal to $N_{hard}$, the stress at an elongation of 100% (initial stress) becomes high. In contrast, when a flow orientation cannot be applied due to the solution resistance during reaction spinning, for example, in the conventional chemical reaction spinning process, the $N_{hard}$ is small, and the initial stress is low. On the other hand, $N_{hard}$ of an elastic PUU fiber obtained by the dry spinning process is comparatively large for reasons as explained below. The hard segments in the polymer solution are difficult to dissolve in the solvent, and as a result the hard segments are already agglomerated with each other in the solution to form a considerable amount of crosslinks.

A change in the crosslinking point density of the PUU fiber of the present invention at an elongation of at least 100% is somewhat complicated. The crosslinking density does not necessarily increase monotonously in accordance with the elongation. For example, the crosslinking density at an elongation of 400% (N400) is sometimes smaller than that at an elongation of 100% (N100). In particular, the phenomenon is characteristically manifested when N100 is large, the reason for which is not fully clear. As explained above, the hard segment crosslinking points of the PUU fiber of the present invention include different blocks in which the hard segment block is enclosed by the soft segment block, in addition to the hard segment block in which urea bonding portions are agglomerated each other. Since the bonding of the different blocks is incomplete, the bonding force is relatively weak, and dissociation among the blocks takes place due to the tension during elongation. As a result, orientation crystallization of the soft segments is not induced, that is, $N_{crystal}$ does not increase; therefore, N400 does not increase sharply. On the other hand, for the elastic PUU fiber produced by dry spinning, relatively firm crosslinks composed of hard segments are already formed in the polymer solution as explained above, the bonding force of which is strong and which effectively act as a supporting point; therefore, the soft segments are oriented and crystallized by elongation. Consequently, not only the pseudo-crosslinks ($N_{crystal}$) but also the entanglement of the molecular chains ($N_{entangl}$) sharply increases, which leads to a sharp increase in N400.

When the PUU fiber of the present invention is elongated by at least 400%, the hard segment block dissociated from the different blocks effectively acts as a supporting point as explained above. As a result, the soft segments gradually start orientation crystallization when the elongation exceeds a value slightly larger than 600%, and entanglement of the molecular chains simultaneously starts. Nt thus increases, and consequently a high strength at break and a high elongation at break is manifested.

Next, the features of the PUU fiber of the present invention will be quantitatively explained.

In the present invention, the feature of the PUU fiber of the present invention at an elongation of 0% (nontensile state) is defined by the birefringence index.

The PUU fiber of the present invention has a birefringence index ($\Delta n$) of from at least $1.0 \times 10^{-4}$ to $8.0 \times 10^{-4}$ in a nontensile state. In general, the birefringence index of a nonelongated elastic PUU fiber is significantly small compared with those of other synthetic fibers. Moreover, the birefringence indexes of elastic PUU fibers other than that of the elastic PUU fiber of the present invention are about $1.0 \times 10^{-2}$ when the fibers are produced by dry spinning, and about $1.0 \times 10^{-3}$ when the fibers are produced by the conventional reaction spinning.

Although the PUU fiber of the present invention can be obtained by shaping at high speed, $\Delta n$ of the fiber thus obtained does not exceed $8.0 \times 10^{-4}$. The PUU fiber of the present invention having $\Delta n$ as explained above has a elongation at break of at least 500%, a high initial stress and a high strength at break. Although a PUU fiber having $\Delta n$ less than $1.0 \times 10^{-4}$ shows a high elongation at break, it shows poor initial stress and strength at break.

The PUU fiber of the present invention has N100 of at least $5.0 \times 10^{26}/m^3$, N400 of from $4.0 \times 10^{26}$ to $3.0 \times 10^{27}/m^3$, and Nt of at least $1.6 \times 10^{27}/m^3$. When N100 is less than $5.0 \times 10^{26}/m^3$, the initial stress is small as determined by the formula (2), and the PUU fiber has poor practicability. When Nt is less than $1.6 \times 10^{27}/m^3$, the PUU fiber has a small strength at break.

Of the PUU fibers of the present invention, those PUU fibers which are crystalline in a nonelongated state are seen to have particularly large N100. Such fibers have extremely large $N_{crystal}$ even in a low elongation region due to the crystalline properties of the polyol in a nonelongated state. Owing to the contribution as mentioned above, the PUU fiber comes to have a crosslinking density at the initial elongation (N100) exceeding $1.0 \times 10^{27}/m^3$ and the initial stress exceeds 0.1 g/d at an elongation of 100%.

When N400 of the PUU fiber of the present invention is smaller than $4.0 \times 10^{26}$, the stress becomes excessively small, and the fiber in the products is loosened. When N400 thereof exceeds $3.0 \times 10^{27}$, a rise of the stress takes place.

For the PUU fiber of the present invention, not only the absolute value of the crosslinking density (N) but also the relative value of N400 to N100 is important.

The PUU fiber of the present invention shows a characteristic value of the N400/N100 ratio of 0.9 to 1.3, which is extremely low as compared with the value of 2 to 3 for an elastic PUU fiber produced by dry spinning. Moreover, an elastic PUU fiber produced by conventional reaction spinning shows an N400/N100 ratio of about 1.4 to 1.8, N100 of about $3.5 \times 10^{26}/m^3$ and Nt of about $1.1 \times 10^{27}/m^3$.

The N400/N100 ratio clearly expresses the features of the PUU fiber of the present invention. When N100 is at least $5 \times 10^{26}/m^3$, and the N400/N100 ratio is from 0.9 to 1.3, the initial stress is high, and the rise of the stress in the medium elongation region is small.

The elastic PUU fiber produced by conventional spinning has a N400/N100 ratio close to that of the PUU fiber of the present invention. However, it has small N100 and Nt as compared with the PUU fiber of the present invention.

Nt of the PUU fiber of the present invention is usually from 3.0 to $4.0 \times 10^{27}/m^3$ (from 1.2 to 1.5 g/d as a strength at break), and is about the same as Nt of the elastic PUU fiber produced by conventional dry spinning. An appropriate PUU fiber of the present invention has Nt reaching $5.0 \times 10^{27}/m^3$ (corresponding to a strength at break of at least 1.5 g/d), and it is comparable to the elastic PUU fibers in the category of the most strong ones among the elastic ones produced by dry spinning.

As a result of manifesting such a specific dependence of elongation on the crosslinking density, the PUU fiber of the present invention shows a sufficiently high initial stress in the elongation initial region and a significantly low rise of the stress in the medium elongation region compared with the elastic PUU fiber produced by conventional chemical reaction spinning, and realizes a high strength at break and a high elongation at break.

Since such a PUU fiber of the present invention has excellent properties, it can provide fabrics having decreased process unevenness, and processed products which show no deformation of the shapes and give a feel of close fitting and no excessively tightening feel during wearing.

Furthermore, since the elastic PUU fiber manifests a high strength at break and a high elongation at break, it does not show yarn breakage even when the elastic PUU fiber is overly elongated and contracted repeatedly during processing the fiber or during wearing the products; the product quality is not impaired; the product durability is significantly improved.

The PUU fiber of the present invention usually shows an initial stress from 0.07 to 0.1 g/d, a strength at break of at least 1.2 g/d and a elongation at break from 700 to 1,000%; it appropriately shows an initial stress of at least 0.1 g/d, a strength at break of at least 1.5 g/d, and a elongation at break from 700 to 900%.

A second invention of the present invention is a process for producing a polyurethaneurea continuous shaped article comprising extruding from a shaping nozzle a liquid polyurethane prepolymer having isocyanate groups at least two molecular ends at an extrusion line of extruding speed of Ls, introducing the extruded polyurethane prepolymer into a flowing bath composed of a polyamine-containing reaction solution flowing at an average flowing speed Vf in the traveling direction thereof under the condition of Ls≦Vf, whereby the chain of the polyurethane prepolymer is extended by the reaction of the isocyanate groups with the polyamine in the flowing bath and a solidified polyurethaneurea is produced, and taking up the polyurethaneurea at a speed (withdrawal speed) of Vt which is Vf or more.

The production process of the present invention will be explained in detail by taking a PUU fiber as an example. The production process can also be applied similarly to a film.

The polyurethane prepolymer (PUP) used in the present invention, having isocyanate groups at both molecular ends and obtained by the reaction of a polyisocyanate and a polyol is a liquid prepolymer having isocyanate groups at molecular ends and obtained by reacting at least one polyisocyanate selected from aliphatic, alicyclic or aromatic polyisocyanates with a polyol according to the conventional procedure under the condition that the isocyanate groups are stoichiometrically excessively present. Fundamentally, there is no limitation on the combination of the polyisocyanate and the polyol for obtaining the PUP of the present invention so long as the PUP is a liquid capable of being extruded through a shaping nozzle.

Aliphatic di- and triisocyanates, and aromatic di- and triisocyanates can be used as the polyisocanates in the present invention. Concrete examples of the aliphatic diisocyanate include 1,4-tetramethylene diisocyanate, 1,6-hexamethylene diisocyanate, 1,12-dodecane diisocyanate, 1,6,11-undecane triisocyanate, 4-methyl-1,8-octane diisocyanate, 1,3,6-hexamethylene triisocyanate and 3,3-dimethylpentane-1,5-diisocyanate. Moreover, cyclic fatty diisocyanates such as 1,3- and 1,4-diisocyanates can also be used. Examples of the fatty triisocyanate include fatty triisocyanates such as lysine ester triisocyanate, 1,3,6-hexamethylene triisocyanate and 1,8-diisocyanate-4-isocyanatomethyloctane, triphenylmethane triisocyanate and tris(isocyanatophenyl) thiophosphate. A combination of these triisocyanates and the isocyanates mentioned above can be quite safely used.

As the aromatic di- and triisocyantes, those isocyanates in which the isocyanate groups are directly bonded to each of the benzene nuclei and two of the isocyanate groups are located at positions para to each other are preferred. An aromatic diisocyanate in which two isocyanate groups are asymmetrically bonded, for example, 2,4-tolylene diisocyanate or 1,3-phenylene diisocyanate can be used to give the PUU fiber of the present invention. However, such isocyanates are not preferred because the physical properties of the PUU fiber are deteriorated compared with those of a PUU fiber obtained from an aromatic diisocyanate in which the diisocyanate groups are located at positions para to each other. Examples of such an aromatic diisocyanate include 1,4-phenylene diisocyanate, 4,4'-diphenylmethane diisocyanate (MDI), 4,4'-diphenyl ether diisocyanate, 1,5-naphthalene diisocyanate, 2,6-naphthalene diisocyanate, tolylene diisocyanate, m- and p-xylylene diisocyanates, and $\alpha,\alpha,\alpha',\alpha'$-tetramethyl-p-xylylene diisocyanate. Of these aromatic diisocyanates, 4,4'-diphenylmethane diisocyanate (MDI) is particularly preferred in view of the balance between the viscosity of the PUP and the physical properties of the PUU fiber. Triphenylmethane triisocyanate, tris (isocyanatophenyl) thiophosphate, and the like can be used as the aromatic triisocyante.

Although the polyol used in the present invention is not restricted, it preferably has a number average molecular weight of 800 to 6,000, and a melting point of up to 60° C. Examples of the polyol include polyether polyols, polyester polyols, polylactone polyols and polycarbonate polyols. Moreover, polydimethylsiloxane polyols and non-hydrogenated or hydrogenated polybutadiene polyols can also be used.

Examples of the polyether polyol include polyoxytetramethylene glycol (PTMG), poly(1,5-pentanediol) and polyethylene glycol. These polyols may be linear or branched. Examples of the polyester polyol include those which are obtained from the reaction of one of or a mixture of at least two of the dibasic acids such as oxalic acid, succinic acid, glutaric acid, fumaric acid, sebacic acid, maleic acid, itaconic acid, adipic acid and malonic acid with one or at least two of the diols such as ethylene glycol, propylene glycol, butanediol, hexamethylene glycol and cyclohexanedimethanol. A reaction product obtained by further reacting a polyester obtained by such a procedure as explained above and having carboxyl groups at the molecular ends with a polyether diol such as polyoxyethylene glycol, polyoxypropylene glycol, polyoxytetramethylene glycol or polyoxypentamethylene glycol may also be used. Natural polyester polyols can also be used.

Examples of the polylactone polyol include a reaction product of a hydroxycarboxylic acid obtained by ring opening polymerization of ε-caprolactone, or the like, and a diol such as propylene glycol or butanediol, or a reaction product of the hydroxycarboxylic acid and a polymer diol such as a polyoxytetramethylene glycol or a polyoxypentamethylene glycol.

Examples of the polycarbonate polyol include poly(butane-1,4-carbonatediol), poly(pentane-1,5-carbonatediol) and poly(hexane-1,6-carbonatediol) which are obtained by reacting an alkylene carbaonte with 1,4-butanediol, 1,3-pentanediol, 1,5-pentanediol, 1,6-hexanediol, or the like, and polycarbonate diols obtained from these copolymers and mixtures of the compolymers.

Of these polyols, the polyester polyol and polylactone polyol tend to be embrittled by fungi; the polycarbonate polyol is difficult to handle due to its high melt viscosity; moreover, the polyoxytetramethylene glycol (PTMG) is particularly preferred in view of the chemical stability and tensile properties of the PUU fiber.

In order to obtain desired physical properties of the PUU fiber by controlling the urethane group concentration in the PUP, a low molecular weight diol can be added which is selected from fatty diols such as ethylene glycol, 1,2-propanediol, 1,4-butanediol, 2-methyl-1,4-butanediol, neopentyl glycol and 3-methyl-1,5-pentanediol, alicyclic diols such as cyclohexanediol and tricyclodecanedimethanol and aromatic diols such as 1,4-bis(β-hydroxyethoxy)benzene.

In order to introduce a branched structure into the PUP, a low molecular weight polyol such as glycerin, trimethylol ethane, trimethylol propane and pentaerythritol can be added.

A stoichiometrical ratio of the polyisocyanate to polyol in the present invention is preferably from 1.1 to 2.5 in view of the viscosity and molecular weight of the PUP, and the tensile properties and heat resistance of the PUP fiber.

The PUP preferably is a viscous liquid having a viscosity of about 100 to 6,000 P (20° C.). In order to adjust the viscosity of the PUP, a ketone such as acetone, methyl ethyl ketone and methyl isobutyl ketone, an amide such as N,N-dimethylacetamide and N,N-dimethylformamide, an ether such as diethyl ether, tetrahydrofuran and dioxane, dimethylsulfoxide, or the like may be added to the PUP in a small amount.

So-called stabilizing agents such as antioxidants, anti-yellowing agents and UV-ray absorbers can be safely added to the PUP.

The polyamine-containing solution of the present invention (hereinafter referred to as a reaction solution) comprises a diamine and a solvent which is inert to the diamine, which substantially inhibits no reaction of the isocyanate groups in the PUP with the amine compound, and which does not dissolve the PUU fiber. The solvent is used as a diluent of the amine or a viscosity modifier. The solvent is still more preferable when it acts to promote diffusion and penetration of the amine into the PUP.

Known aliphatic, alicyclic and aromatic polyamines can be used as chain extenders of the PUP. Although there is no specific limitation on the polyamines, specific examples of the polyamines include a group consisting of ethylenediamine, propylenediamine, 1,3-propanediamine, 1,2-butylenediamine, 1,3-butylenediamine, 1,4-butylenediamine, 1,5-hexanediamine, isobutylenediamine, 1,6-hexanediamine, cyclohexanediamine, isophoronediamine, piperazine, 2-methylpiperazine, phenylenediamine, tolylenediamine, m-xylenediamine, p-xylenediamine, 3,3'-dichloro-4,4'-biphenyldiamine, 2,6-diaminopyridine, 4,4'-diaminodiphenylmethane, hydrogenated m-phenylenediamine, p-phenylenediamine, tetrachloro-m-phenylenediamine, tetrachloro-p-phenylenediamine, and mixtures of these compounds.

A low molecular weight triamine such as tris(2-aminoethyl)amine or a polyoxyalkylenepolyamine having a molecular weight of at least 400 such as a polyamine (trade name Jeffamine, manufactured by Huntsman) can be used in accordance with the purpose.

Furthermore, there is a diaminourea compound prepared from an organic diisocyanate and an organic diamine as disclosed in Japanese Unexamined Patent Publication (Kokai) No. 5-155841. Examples of the compound include N,N'-(methylenedi-4,1-phenylene)bis{2-(ethylamino)-urea},N,N'-(methylenedi-4,1-phenylene)bis{2-(2-ethylamino)-urea} and N,N'-(methylenedi-4,1-phenylene) bis{6-(hexylamino)-urea}.

Monoamines such as methylamine, ethylamine, propylamine and its isomer, butylamine and its isomer and diethylamine can be used in combination as polymerization regulators. An asymmetric hydrazine such as dimethylhydrazine and diethylhydrazine can also be used as the monoamine.

In view of ensuring the polymerization reaction rate and the mechanical properties of the PUU fiber thus obtained, a diamine compound such as ethylenediamine having no steric hindrance groups on respective carbon atoms adjacent to the amino groups and being highly symmetrical in structure is preferred.

Next, examples of the solvent for diluting the polyamine include ethylene glycol, 1,4-butanediol, 1,3-butylene glycol, propylene glycol, glycerin, methanol, ethanol, isopropanol, butyl alcohol, amyl alcohol, acetonitrile, propionitrile, N,N-dimethylformamide, N,N-dimethylacetamide, aromatic hydrocarbons such as benzene, toluene, o-xylene, p-xylene, m-xylene, mixed xylene, ethylbenzene, 1,3,5-trimethylbenzene, propylbenzene, isopropylbenzene and butylbenzene. Mixtures of these solvents may also be used. Substances such as surfactants may safely be added for the purpose of promoting diffusion and penetration of the amine into the PUP.

A first essential mode of a production process of the present invention comprises extruding a PUP from a shaping nozzle at an extrusion line speed LS, introducing the extruded PUP into a bath containing a reaction solution (hereinafter referred to as a reaction bath) flowing in the same direction as the traveling direction of the PUP at an average flowing speed Vf under the condition of $Ls \leq Vf$, whereby the chain of the PUP is extended by the reaction of the isocyanate groups with the polyamine and a PUU is being formed, and taking up the PUU thus formed at a take-up speed (a withdrawal speed) Vt which is larger than Vf.

An object of the production process of the present invention is to solve the problems that the production rate is low and a PUU fiber having a small thickness cannot be produced in the conventional reaction spinning and to provide a technology for producing a PUU fiber having excellent mechanical properties by making the traveling speed of the reaction solution larger than that of the PUP and that of a filament material in the course of shaping the PUU fiber (hereinafter referred to as a PUU filament material), whereby the PUU filament material is shaped in a state of low solution resistance.

When Ls>>Vf, the reaction solution markedly resists the traveling of the PUU filament material, and the filament material loosens and fluctuates in the reaction bath; the filament material passes through the reaction bath in an unstretched and unstationary state. The object of the present invention thus cannot be achieved.

Furthermore, when the PUP is extruded at a speed Ls in a speed region where Vf is slightly lower than Ls, the line speed of the PUU filament material is rapidly decreased once, and then accelerated to the flow speed Vf. A large strain deformation rate caused by the deceleration and acceleration is applied to the PUU filament material during the extrusion. As a result, shaping at a high speed becomes difficult, and the PUU fiber thus obtained unpreferably has a low strength and a low elongation.

The average flow speed Vf defined by the present invention is a value obtained by dividing a reaction solution amount flowing out of the reaction bath outlet portion by the cross-sectional area of the reaction bath. When the reaction bath is a tubular path having a circular cross-section, the central portion of the tubular path has a flow speed approximately twice the Vf. It can be concluded from the experimental observation results that the PUP and PUU path through about the central portion of the tubular path and reach the outlet portion thereof under the condition of the production process in the present invention. Accordingly, the filament material has a traveling speed of 2×Vf in a stationary state. However, when the inlet portion of the tubular portion is tapered or it is formed with an outer tube of a tubular path having a larger caliber, as will be shown later by a figure, the flow speed of the reaction solution is not in a stationary state in the portion, and is close to Vf. At least in the inlet portion of the tubular path, Vf>Ls must therefore be attained.

In the present invention, the following condition must be satisfied: $Vt \geq Vf$.

In view of the solution resistance, the following condition is best: Ls=Vf=Vt. However, as a fiber or a tape generally manifests a higher strength and a larger elongation when shaped under a suitable tension, the toughness (strength× elongation) of the PUU fiber is improved when $Ls \leq Vf < Vt$. Moreover, the condition is preferable in view of spinning stability, and no breakage of the PUU filament material takes place under the condition.

When the PUP is contacted with the reaction solution, the chain extension (urea formation) reaction is instantaneously completed (from about several tens to several hundred of microseconds). However, fundamentally, a urea-formation reaction takes place from the surface of the PUP, and the surface layer is changed to a solid at first. Accordingly, it is after the beginning of solidification of the surface layer that the extruded PUP manifests a stress corresponding to the take-up speed. The PUP is estimated to travel while accompanying the flow of the reaction solution for an extremely short period of time prior to the surface solidification. When Ls>Vf during the accompanying period, the PUP substantially suffers a solution resistance from the reaction solution unpreferably. The PUP is accelerated until the traveling speed reaches the take-up speed Vt simultaneously with the whole urea formation, and shaped into a PUU filament material while being suitably oriented with the molecular chain orientation and relaxation being repeated. When Vt>Vf, the reaction solution around the periphery of the PUU filament material which is acceleratedly passed through the reaction bath is locally accelerated while accompanying the PUU filament material; therefore, it does not become a substantial resistance material. Accordingly, the filament material shows no breakage even under the condition of Vt>>Vf, and it becomes possible to take off the filament material having a small fineness at a high speed.

Concretely, for example, when the production process of the present invention is applied to a PUP prepared from 4,4'-diphenylmethane diisocyanate (MDI) and polyoxytetramethylene glycol (PTMG), imparting a draft ratio (Vt/Ls) of from 25 to 30 causes no breakage in an appropriate case. Morerover, a higher draft ratio results in a higher toughness. Accordingly, when Ls is 50 m/min, the take-up speed Vt reaches as high as about 1,500 m/min.

Furthermore, since separation of the PUU filament material from the reaction solution becomes difficult as the take-up speed Vt increases or the monofilament fineness decreases, $Vt \geq Vf$ is preferred for the purpose of continuously taking up the filament material in a tensile state.

When a flowing bath such as a tubular path is used as the reaction bath, the extruded PUP can always be contacted with the fresh reaction solution. Accordingly, the amount of the reaction solution may be the minimum necessary for forming the isocyanate groups in the PUP into urea. Consequently, it becomes possible to considerably decrease the solution resistance.

A horizontal type spinning apparatus is adopted in the chemical reaction spinning described in the U.S. Patent specification mentioned above, and the reaction bath substantially stands still. In the process, the PUU filament material must be taken up at a low speed because allowing the reaction solution to flow at a high speed is difficult and resistance to the separation of the filament material from the reaction bath is significant.

A first preferred mode of the present invention is a process for producing the PUU continuous shaped article, wherein the polyurethaneurea is taken up the flowing bath at a take-up speed Vt1, and it is taken up at a take-up speed Vt (wherein Vt≦1.5Vt1)

In the process, the step of conversion of the PUP into the PUU filament material takes place in a state close to a nontensile one, and the PUU filament material is deformed without structural destruction. At this time, as described above, relaxation of the polyurethaneurea chain preferentially takes place compared with orientation, and the hard segments come to have a high molecular weight and are suitably dispersed. The PUU filament material having left the reaction bath passes through the entire steps without suffering excessive deformation. As a result, the PUU fiber of the present invention having a birefringence index $\Delta n$ close to $1.0 \times 10^{-4}$ which is the lower limit value in a nontensile state, high N100 and extremely high Nt is obtained. That is, the PUU fiber shows an initial stress from 0.07 to 0.1 g/d, an elongation at break from 700 to 1,000%, and a strength at break as high as at least 1.2 g/d.

A second preferred mode of the present invention is a process for producing the PUU continuous shaped article, wherein the polyurethaneurea is taken up the flowing bath at a take-up speed Vt1, and it is taken up at a take-up speed Vt (wherein Vt>1.5Vt1)

The process of the present invention is effective for obtaining the PUU fiber of the present invention showing a particularly high initial stress (namely, initial elastic modulus). When Vt is at least 1.5 times as much as Vt1, the initial stress becomes still higher.

Further stretching the PUU filament material and the PUU fiber the shaping of which is almost completed becomes possible in the process. The entire polyurethaneurea molecular chain therefore becomes more oriented, and part of the polymer diol forming the soft segments is orientation crystallized.

As a result, the PUU fiber thus obtained shows $\Delta n$ close to $8.0 \times 10^{-4}$ which is the upper limit value of the present invention, and an initial stress from 0.1 to 0.25 g/d defined at an elongation of 100%, which in some cases is actually 5 times as much as that of an elastic PUU fiber obtained by the conventional chemical reaction spinning. Moreover, the PUU filament material becomes an excellent elastic PUU fiber showing a elongation at break of at least 500% and a strength at break of at least 1.4 g/d.

It is preferred that the ratio of Vt to Ls (Vt/Ls) do not exceed 30, though the ratio depends on the PUP used.

The process of the present invention makes it possible to spin at a high speed at least 10 times as much as that of the conventional reaction spinning, and attains a spinning rate close to that of dry spinning. Moreover, the initial stress is sufficiently large compared with that of the elastic PUU fiber prepared by the conventional chemical reaction spinning; in an appropriate case, it reaches about 5 times as much. Moreover, the elongation at break is increased to 700 to 1,000%. The strength at break is also comparable to the highest strength of the PUU fiber obtained by dry spinning.

In addition to what has been explained above, it has become possible to produce a PUU fiber having a size as small as 3 denier which cannot be attained by the conventional reaction spinning and dry spinning. Moreover, it is also possible to produce a PUU fiber having a thickness as large as at least 200 denier.

The production process of the present invention will be explained by making reference to the drawings. In a production apparatus in FIG. 1, a PUP (3) extruded through a shaping nozzle (2) incorporated into a nozzle holder (1) is first contacted with a reaction solution containing a polyamine in a closed state in a trumpet-like tubular path inlet portion (4) filled with the reaction solution, and subsequently introduced into a tubular path main body (5) the diameter of which is sharply reduced in a trumpet-like shape. The PUP (3) reacts with the polyamine to extend the chain and form a PUU filament material in the tubular path main body (5). The PUU filament material is then released to a gas atmosphere in the tubular path inner tube outlet portion (6), separated from the reaction solution, and taken up. The reaction solution is poured into a production apparatus main body (8) in a reaction solution inlet portion (7), passed through a distribution plate (9), introduced into the tubular path main body (5) from the inlet portion (4) of the inner tube 8 of the trumpet-like tubular path, and is allowed to flow out of the main body outlet portion (6). The trumpet-like tubular path inlet portion (4) and the tubular path main body (5) are filled with the reaction solution in a stationary state, and the reaction solution can be forcibly supplied. The reaction solution can therefore be transferred at a flow speed higher than that at the time of allowing the reaction solution to flow naturally.

In the present invention, the method of separating the PUU filament material having left the tubular path from the reaction solution is important particularly when a PUU fiber having a small thickness is to be produced.

In the present invention, the following three methods are preferred, though the methods are not restricted thereto.

Figure 1:
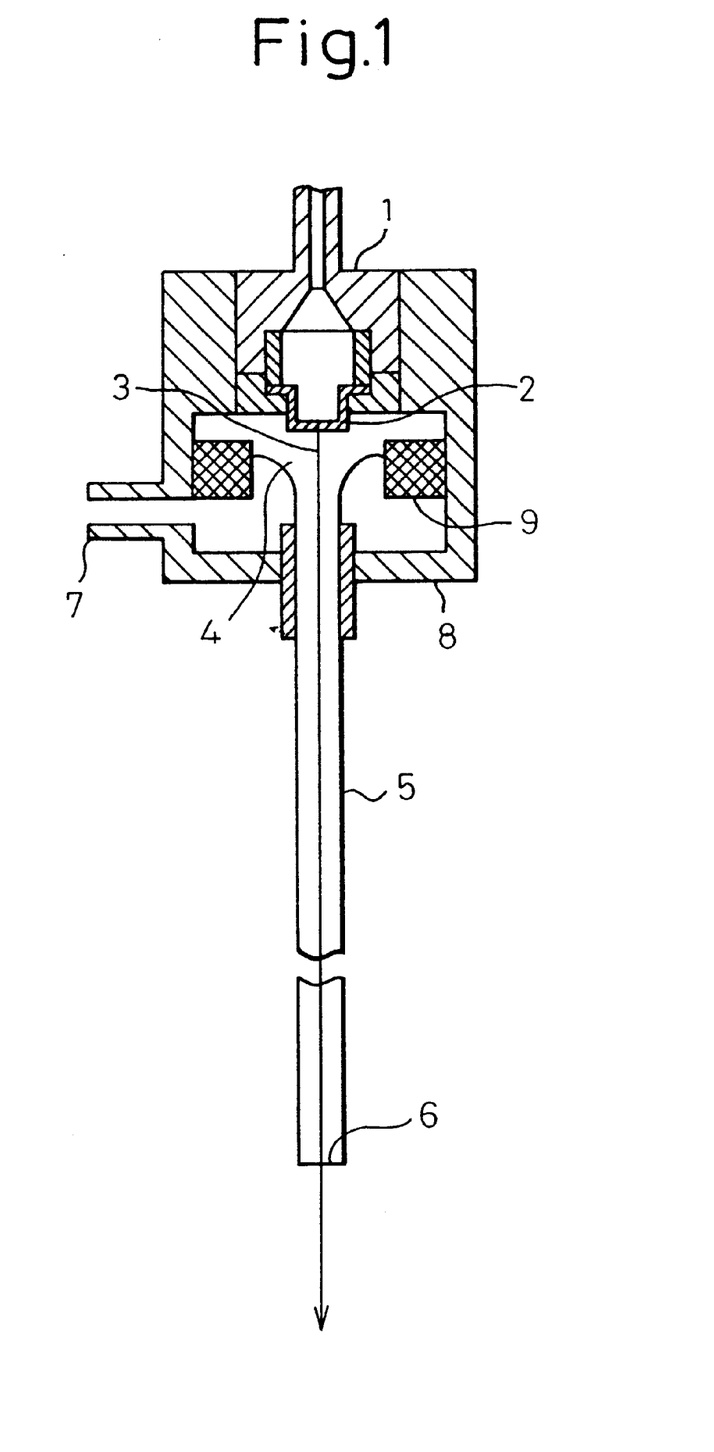
FIG. 1 is a schematic view showing one embodiment of an apparatus for producing a continuous shaped article used in the present invention.

First, the PUU filament material having left the tubular outlet portion (6) is allowed to travel in the air or inert gas, and the reaction solution is allowed to become droplets, followed by separating them from the PUU filament material. Since the traveling distance differs depending on the surface tension, etc. of the reaction solution, it may be determined suitably by experiments.

Second, a short tube orifice, etc. is arranged between the tubular path outlet portion and a take-up roll, and the PUU filament material is passed through the orifice to be separated while the excessive reaction solution being overflowed. A combination of the second method with the first method is still more effective.

Figure 2:
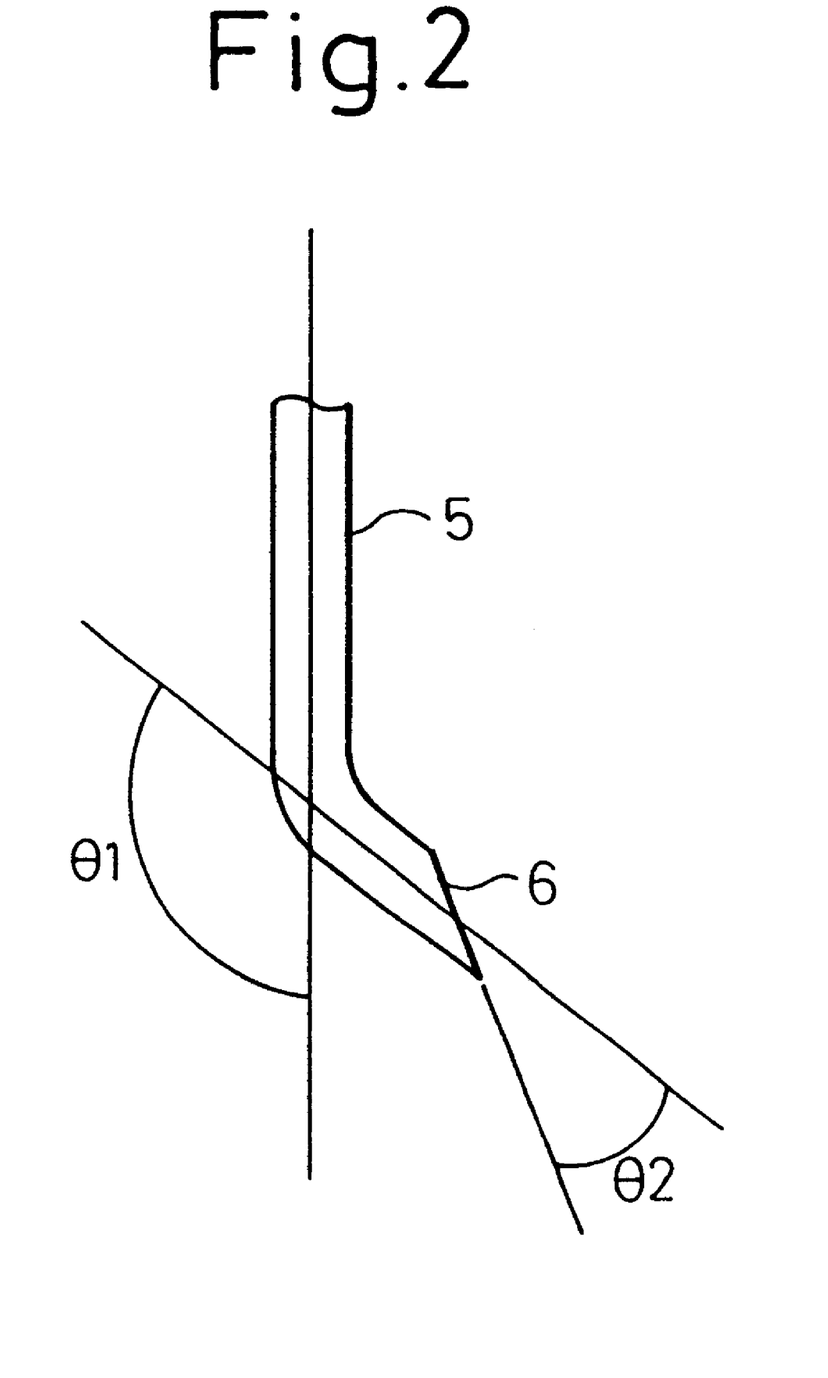
FIG. 2 is a schematic view showing one embodiment of an apparatus for separating a reaction solution from a continuous shaped article used in the present invention.

Third, as shown in FIG. 2, the tubular path outlet portion (the portion (6) in FIG. 1, for example) is deflected at an angle of θ1, and the reaction solution is separated. An angle from 120 to 150° is appropriate as θ1. The cut-out angle (θ2) of the cut-out portion in the outlet portion is preferably (180−θ1) degrees. It is preferred that θ1 be made large when the reaction solution flow speed Vf is increased.

Figure 3:
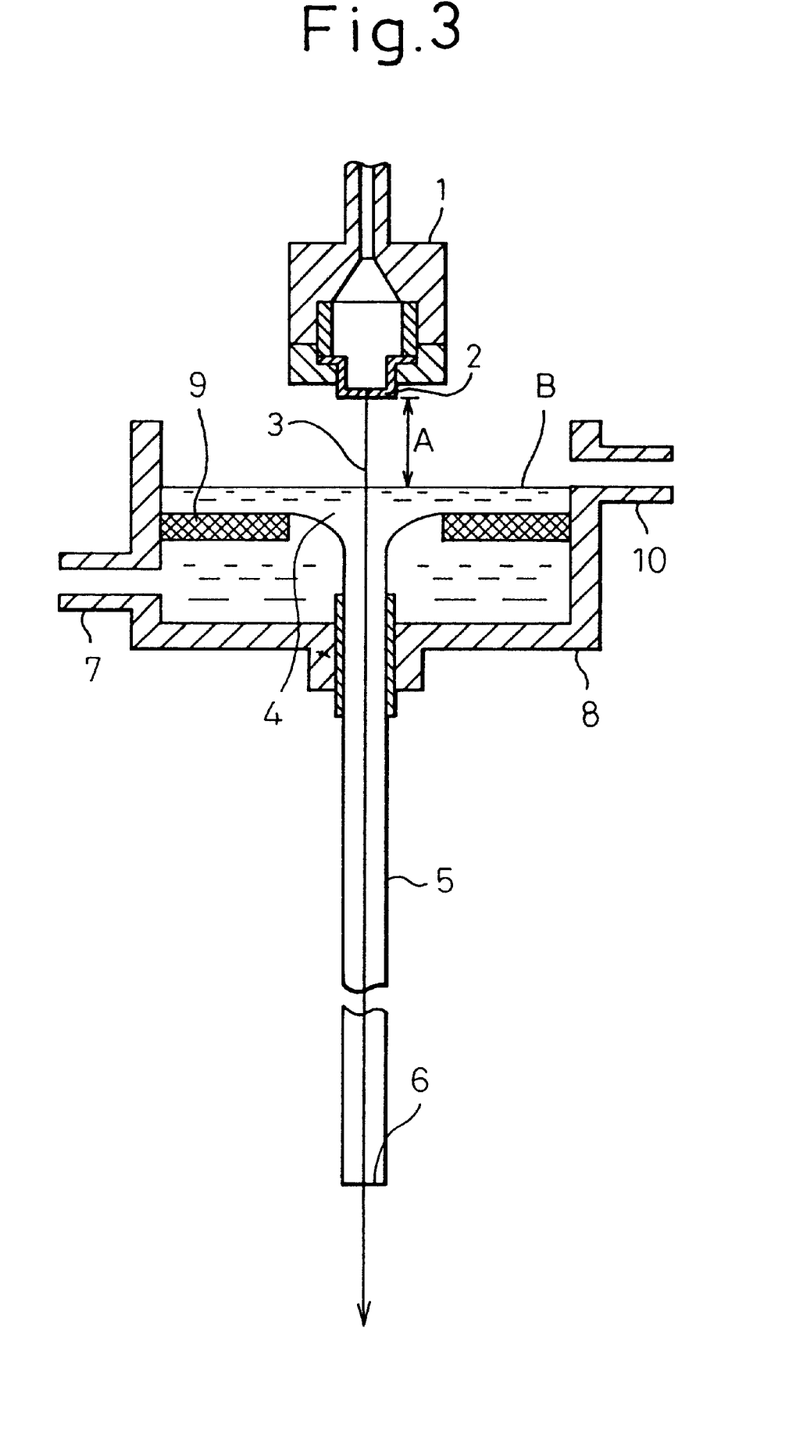
FIG. 3 is a schematic view showing another embodiment of an apparatus for producing a continuous shaped article used in the present invention.

In FIG. 3, the PUP extruded through the nozzle 2 passes through an air gap portion A, contacted with the reaction solution at a reaction solution interface B, and introduced into the tubular path inlet portion (4) the diameter of which is sharply reduced in a trumpet-like shape. The PUP is then introduced into the tubular path (5), and reacts with a polyamine to extend its chain and form a PUU filament material. The PUU filament material is then released in the tubular path outlet portion, separated from the reaction solution, and taken up. The polyamine-containing reaction solution is poured into the production apparatus main body (8) from the reaction solution inlet (7), passed through the distribution plate (9), and allowed to flow in the tubular path inlet portion (4) while the solution surface regulated by an overflow tube (10) is being maintained. The reaction solution and the PUP are contacted with each other on the solution surface B for the first time. In a stationary state, the reaction solution must fill the entire tubular path.

In the method, the flow speed of the reaction solution supplied to the tubular path can be considerably decreased compared with that of the reaction solution having the same head length and being in a free fall descending state because of a pressure loss in accordance with the material and structure of the tubular path, and the properties of the reaction solution, which is appropriate for decreasing the flow speed of the reaction solution within the tubular path to a desired one. The PUP can also be cooled or warmed, or it can be preliminarily contacted with a reaction agent in the air gap portion.

The PUU filament material having left the tubular path is taken up under given conditions, and the excessive amine and the solvent for diluting the amine are directly dried or washed with water, etc. if necessary; the filament material is then dried with hot air; additives or finish oil is then imparted to the filament material, if desired, which is then wound. The additives and finish oil can be safely imparted before drying. The PUU filament material can also be annealed by imparting excessive heat thereto during drying. The annealing can increase the strength and elongation of the PUU filament material, improves the toughness, and is effective because chemical reactions such as transamination can be induced.

The present invention will be explained below more concretely by making reference to examples. However, the present invention is in no way restricted thereto.

EXAMPLE 1

A PUP prepared from 4,4'-diphenylmethane diisocyanate (hereinafter referred to as MDI) and polyoxytetramethylene glycol (hereinafter referred to as PTMG) was synthesized as described below.

MDI (molecular weight of 250.3) in an amount of 53.8 g was weighed and placed in a 500-ml separable flask, and stirred at 50° C. in a nitrogen gas atmosphere until MDI was completely melted. The molten MDI was then dehydrated in vacuum, and 246.2 g of PTMG having a molecular weight of 1,830 and held at 50° C. was placed in the flask. The mixture was then heated to 80° C., and reacted for 4 hours, whereby a PUP having isocyanate groups at the molecular ends, and with an equivalent ratio (hereinafter referred to as an R value) of the NCO groups to the OH groups of 1.60, was synthesized. The PUP thus obtained was centrifugally defoamed at 45° C. The product thus obtained is designated PUP-1.

EXAMPLE 2

PUP-2 prepared from MDI, PTMG and 1,4-butanediol (hereinafter referred to as 1,4-BD) was synthesized as described below.

MDI in an amount of 53.8 g was weighed and placed in a 500-ml separable flask, and stirred at 50° C. in a nitrogen gas atmosphere until MDI was completely melted. The molten MDI was then dehydrated in vacuum, and 246.2 g of PTMG having a molecular weight of 1,830 and held at 50° C. was placed in the flask. The mixture was then heated to 80° C., and reacted for 1.5 hours. 1,4 BD in an amount of 1.35 g was added 1.5 hours after heating to 80° C., and the reaction was further continued for 1 hour. MDI in an amount of 6.0 g was then further added, and the reaction was continued for 1 hour, whereby a PUP having an R value of 1.60 was synthesized. The PUP thus obtained was centrifugally defoamed at 45° C. The product thus obtained is designated PUP-2.

EXAMPLE 3

PUP-3 prepared from MDI, PTMG and ethylenediamine (EDA) was synthesized as described below.

MDI in an amount of 53.8 g was weighed and placed in a 500-ml separable flask, and stirred at 50° C. in a nitrogen gas atmosphere until MDI was completely melted. The molten MDI was then dehydrated in vacuum, and mixed with 242.5 g of PTMG (molecular weight of 1,830) and 0.12 g of EDA held at 50° C. The mixture was heated to 80° C., and reacted for 4 hours, whereby a PUP having an R value of 1.6 was synthesized. The PUP thus obtained was centrifugally defoamed at 45° C. The resultant PUP was designated PUP-3.

EXAMPLE 4

PUP-4 prepared from MDI, PTMG having a molecular weight of 850 (PTMG 850) and PTMG having a molecular weight of 3,000 (PTMG 3000) was synthesized as described below.

MDI in an amount of 53.8 g was weighed and placed in a 500-ml separable flask, and stirred at 50° C. in a nitrogen gas atmosphere until MDI was completely melted. A PTMG solution in which 42.5 g of PTMG 850 and 172.7 g of PTMG 3000 were mixed was placed in the flask. The mixture was heated to 80° C., and reacted for 4 hours to give a synthesized PUP having an R value of 2.0. The PUP thus obtained was centrifugally defoamed at 45° C., and the resultant product was designated PUP-4.

EXAMPLES 5 AND 6 AND REFERENCE EXAMPLES 1 AND 2

Using a closed type tubular path having an inside tube diameter of 2.0 mm and a tube length of 3,000 mm as shown in FIG. 1, the prepolymer PUP-1 was extruded through a spinning nozzle having 4 holes each having a hole diameter of 0.15 mm at an extrusion speed Ls of 88 m/min. PUP-1 was then introduced into the tubular path using a reaction solution at 30° C. containing EDA and isopropyl alcohol (IPA) in an EDA/IPA molecular ratio of 20/80 and flowing at an average speed of 200 or 400 m/min, and passed through the tubular path while being shaped into a PUU filament material, which was taken up a tubular path outlet by a snub roll including 3 rolls at a speed of 500 or 1,000 m/sec, respectively. The PUU filament material was further continuously washed with water, dried, coated with finish oil, taken up at a speed of 550 or 1,100 m/min, respectively, and wound at a speed of 500 or 1,000 m/min, respectively. The resultant wound PUU fibers are designated Example 5 and Example 6, respectively.

Table 1 shows the tensile properties of Examples 5 and 6. Table 1 also shows the tensile properties of a commercially available elastic PUU fiber (Reference Example 1) produced by reaction spinning and a commercially available elastic PUU fiber (Reference Example 2) produced by dry spinning. Examples 5 and 6 show a high initial elastic modulus, a high strength and a large elongation, that is, they showed properties as excellent elastic PUU fibers.

TABLE 1

|  | Example 5 | Example 6 | Ref. Example 1 | Ref. Example 2 |
|---|---|---|---|---|
| Fineness (denier) | 26 | 14 | 280 | 20 |
| Δn | $6.3 \times 10^{-4}$ | $7.5 \times 10^{-4}$ | $1 \times 10^{-3}$ | $1 \times 10^{-2}$ |
| N100 | $1.1 \times 10^{27}$ | $1.3 \times 10^{27}$ | $3.5 \times 10^{26}$ | $1.1 \times 10^{27}$ |
| N400 | $1.1 \times 10^{27}$ | $1.5 \times 10^{27}$ | $4.9 \times 10^{26}$ | $2.9 \times 10^{27}$ |
| Nt | $3.9 \times 10^{27}$ | $4.2 \times 10^{27}$ | $1.1 \times 10^{27}$ | $4.7 \times 10^{27}$ |
| N400/N100 | 1.0 | 1.2 | 1.4 | 2.6 |
| Initial stress at an elongation of 100% (g/d) | 0.089 | 0.107 | 0.046 | 0.085 |
| strength at break (g/d) | 1.51 | 1.67 | 0.63 | 1.53 |
| elongation at break (%) | 751 | 779 | 1118 | 605 |

EXAMPLES 7 TO 10 AND COMPARATIVE EXAMPLES 1 AND 2

Using a closed type tubular path having an inside tube diameter of 2.0 mm and a tube length of 3,000 mm as shown in FIG. 1, the prepolymer PUP-1 was extruded through a spinning nozzle having 1 hole having a hole diameter of 0.15 mm at an injection speed Ls of 88 m/min. PUP-1 was then introduced into the tubular path using a reaction solution at 30° C. containing EDA and isopropyl alcohol (IPA) in an EDA/IPA molecular ratio of 20/80 and flowing at an average flow speed Vf of 30, 60, 90, 100, 160 or 220 m/min, and passed through the tubular path while being shaped into a PUU filament material, which was taken up a tubular path outlet by a snub roll including 3 rolls at a speed (Vt1) of 500 m/min. The PUU filament material was further continuously washed with water, dried, coated with finish oil, taken up at a speed (Vt) of 550 m/min, and finally wound at a speed of 500 m/min to give, in total, 6 PUU fibers having a size of 28 denier. The samples thus obtained at an average flow speed Vf of 30, 60, 90, 100, 160 or 220 m/min, respectively are designated Comparative Example 1, Comparative Example 2, Examples 7 to 10, respectively. Table 2 shows the tensile properties of the samples. Although Comparative Examples 1 and 2 could be spun, they showed poor strength and elongation.

TABLE 2

|  | Comp. Ex. 1 | Comp. Ex. 2 | Ex. 7 | Ex. 8 | Ex. 9 | Ex. 10 |
|---|---|---|---|---|---|---|
| Δn | $9.5 \times 10^{-4}$ | $8.7 \times 10^{-4}$ | $7.9 \times 10^{-4}$ | $6.1 \times 10^{-4}$ | $5.2 \times 10^{-4}$ | $4.3 \times 10^{-4}$ |
| N100 | $1.2 \times 10^{27}$ | $1.2 \times 10^{27}$ | $1.1 \times 10^{27}$ | $1.0 \times 10^{27}$ | $1.0 \times 10^{27}$ | $9.7 \times 10^{26}$ |
| N400 | $1.7 \times 10^{27}$ | $1.5 \times 10^{27}$ | $1.3 \times 10^{27}$ | $1.1 \times 10^{27}$ | $1.0 \times 10^{27}$ | $8.8 \times 10^{26}$ |
| Nt | $2.7 \times 10^{27}$ | $2.7 \times 10^{27}$ | $4.3 \times 10^{27}$ | $4.0 \times 10^{27}$ | $3.6 \times 10^{27}$ | $3.3 \times 10^{27}$ |
| N400/N100 | 1.4 | 1.3 | 1.2 | 1.1 | 1.0 | 0.9 |
| Initial stress at an elongation of 100% (g/d) | 0.100 | 0.095 | 0.086 | 0.083 | 0.080 | 0.078 |
| strength at break (g/d) | 0.62 | 0.68 | 1.55 | 1.51 | 1.47 | 1.45 |
| elongation at break (%) | 406 | 452 | 680 | 721 | 782 | 865 |

EXAMPLES 11 TO 14

Using an air gap type tubular path having an inside tube diameter of 2.2 mm and a tube length of 250 mm as shown in FIG. 3, the prepolymer PUP-1 was extruded through a spinning nozzle having 1 hole having a hole diameter of 0.16 mm and an air gap length of 50 mm at an extrusion speed LS of 33 m/min. PUP-1 was then introduced into the tubular path using a reaction solution at 30° C. containing EDA and IPA in an EDA/IPA molecular ratio of 20/80 and flowing at an average speed Vf of 40 m/min, and passed through the tubular path while being shaped into a PUU filament material. When the PUU filament material was allowed to travel for 1,000 mm from a tubular path outlet portion, it was taken up by a snub roll including 3 rolls at a take-up speed Vt1 of 80, 100, 200 or 600 m/min. The PUU filament material was then washed with water, dried, coated with finish oil, taken up at a speed Vt (Vt=1.2 Vt1), and finally wound at a speed of Vt1. The resultant four PUU fibers thus produced are designated Examples 11, 12, 13 and 14 in accordance with increasing Vt1.

Table 3 shows the tensile properties of the fibers thus obtained. The wide angle X-ray diffraction diagrams of the fibers of Examples 12 to 14 measured in a nonelongated state showed crystalline peaks.

TABLE 3

|  | Example 11 | Example 12 | Example 13 | Example 14 |
|---|---|---|---|---|
| Fineness (denier) | 60 | 30 | 20 | 15 |
| Δn | $7.1 \times 10^{-4}$ | $6.8 \times 10^{-4}$ | $4.3 \times 10^{-4}$ | $3.9 \times 10^{-4}$ |
| N100 | $8.7 \times 10^{26}$ | $1.3 \times 10^{27}$ | $1.4 \times 10^{27}$ | $1.4 \times 10^{27}$ |
| N400 | $9.6 \times 10^{26}$ | $1.3 \times 10^{27}$ | $1.4 \times 10^{27}$ | $1.4 \times 10^{27}$ |
| Nt | $2.1 \times 10^{27}$ | $3.5 \times 10^{27}$ | $4.0 \times 10^{27}$ | $3.8 \times 10^{27}$ |
| N400/N100 | 1.1 | 1.0 | 1.0 | 0.9 |
| Initial stress at an elongation of 100% (g/d) | 0.070 | 0.103 | 0.112 | 0.127 |
| strength at break (g/d) | 0.94 | 1.36 | 1.52 | 1.58 |
| elongation at break (%) | 892 | 756 | 721 | 713 |

EXAMPLES 15 TO 19

Using a closed type tubular path having an inside tube diameter of 2.0 mm and a tube length of 3,000 mm as shown in FIG. 1, the prepolymer PUP-1 was extruded through a spinning nozzle having 1 hole having a hole diameter of 0.15 mm at an extrusion line speed Ls of 60 m/min. PUP-1 was then extrusion into the tubular path using a reaction solution at 30° C. containing EDA and isopropyl alcohol (IPA) in an EDA/IPA molecular ratio of 20/80 and flowing at an average flow speed Vf of 70 m/min, and passed through the tubular path while being shaped into a PUU filament material, which was taken up through a tubular path outlet at a speed (Vt1) of 180 m/min. The PUU filament material was further continuously taken up at a speed (Vt) of 200, 250, 300, 400 or 800 m/min, washed with water, dried, and wound at the same speed on the take-up means respectively. In total, 5 PUU samples were thus produced. The samples having been taken up at respective speeds (Vt) of 200, 250, 300, 400 and 800 m/min are designated Examples 15, 16, 17, 18 and 19, respectively. Table 4 shows the tensile properties of these Examples. Examples 17 to 19 had crystalline properties in a nonelongated state, and a high initial elastic modulus.

TABLE 4

|  | Example 15 | Example 16 | Example 17 | Example 18 | Example 19 |
|---|---|---|---|---|---|
| Fineness (denier) | 48 | 38 | 32 | 24 | 12 |
| Δn | $2.1 \times 10^4$ | $2.7 \times 10^4$ | $3.3 \times 10^{-4}$ | $5.1 \times 10^4$ | $6.1 \times 10^4$ |
| N100 | $9.5 \times 10^{26}$ | $1.1 \times 10^{27}$ | $1.5 \times 10^{27}$ | $2.2 \times 10^{27}$ | $3.1 \times 10^{27}$ |
| N400 | $1.1 \times 10^{27}$ | $1.2 \times 10^{27}$ | $1.5 \times 10^{27}$ | $2.0 \times 10^{27}$ | $2.8 \times 10^{27}$ |
| Nt | $2.3 \times 10^{27}$ | $2.7 \times 10^{27}$ | $3.8 \times 10^{27}$ | $3.9 \times 10^{27}$ | $3.9 \times 10^{27}$ |
| N400/N100 | 1.2 | 1.1 | 0.99 | 0.93 | 0.91 |
| Initial stress at an elongation of 100% (g/d) | 0.076 | 0.088 | 0.121 | 0.175 | 0.248 |
| strength at break (g/d) | 0.97 | 1.12 | 1.41 | 1.42 | 1.44 |
| elongation at break (%) | 835 | 792 | 721 | 706 | 698 |

EXAMPLE 20

Using a closed type tubular path having an inside tube diameter of 2.0 mm and a tube length of 3,000 mm as shown in FIG. 1, the prepolymer PUP-1 was extruded through a spinning nozzle having 1 hole having a hole diameter of 0.08 mm at an extrusion speed LS of 110 m/min. PUP-1 was then introduced into the tubular path using a reaction solution at 30° C. containing EDA and isopropyl alcohol (IPA) in an EDA/IPA molecular ratio of 15/85 and flowing at an average flow speed Vf of 300 m/min, and passed through the tubular path while being shaped into a PUU filament material, which was taken up a tubular path outlet by a snub roll including 3 rolls at a speed of 1,000 m/min. The PUU filament material was further continuously washed with water, dried, coated with finish oil, taken up at a speed of 1,100 m/min, and finally wound up at a speed of 1,000 m/min. The resultant PUU fiber in Example 20 had a thickness of 5 denier. That is, the PUU fiber had an extremely small thickness as an elastic one. Moreover, it is substantially impossible for the conventional reaction spinning or dry spinning process to mold an elastic PUU fiber composed of a monofilament having a thickness of 5 denier at a spinning speed as high as that in the present invention.

EXAMPLE 21

The prepolymer PUP-1 was extruded through a nozzle having one hole 0.16 mm wide and 5 mm long. PUP-1 was then passed through an air gap portion 20 mm long, introduced into an air gap type tubular path having a tubular path outlet portion cross section 1.5 mm wide and 8 mm long (rectangular cross section), and a tubular path length of 400 mm using a reaction solution at 20° C. containing EDA, IPA and a fluoro type surfactant (trade name of Megafac F 833, manufactured by Dainippon Ink and Chemicals Incorporated) in a mixing ratio of EDA/IPA/Megafac F-833 of (20/80)/1 (weight ratio) at an average flow speed Vf of 45 m/min, and passed through the tubular path while the PUU was being shaped into a tape-like PUU. The tape-like PUU was then allowed to travel in the space for a distance of 1,500 mm from a tubular path outlet portion, taken up at a speed Vt of 400 m/min (draft of 14.0) with 3 snub rolls, washed with water, predried, coated with finish oil, and wound at a speed of 400 m/min.

EXAMPLE 22

A PUU film was obtained from the prepolymer PUP-1 in the following manner.

The prepolymer PUP-1 was extruded through a rectangular nozzle having 1 nozzle 0.16 mm wide and 5.0 mm long at an extrusion line speed Ls of 39 m/min into a rectangular closed type tubular path, the inner tube of which had an inlet portion cross section 4 mm wide and 8 mm long, and an outlet portion cross section 1.5 mm wide and 8 mm long (rectangular cross section), and which had a length of 500 mm. PUP-1 was then introduced into the tubular path inner tube using a reaction solution at 20° C. containing ethylenediamine, isopropanol (IPA) and Megafac F-833 in an EDA/IPA/Megafac F-833 weight ratio of (20/80)/1 and having an average flow speed Vf of 200 m/min, and passed through the tubular path while a tape-like PUU was being shaped. The PUU filament material was allowed to travel for 1,000 mm from the tubular path outlet portion, and the tape-like shaped article flowing out of the tubular path was collected on a stainless steel-made screen plate (100 mesh) moving at a speed of 50 m/min. The shaped article was then washed with water on the screen plate, taken up at a speed of 400 m/min, predried with a hot roll, coated with finish oil, and subsequently wound up at a speed of 400 m/min.

EXAMPLE 23

A PUU fiber of the prepolymer PUP-2 was obtained as explained below.

Using a closed type tubular path having an inside tube diameter of 2.0 mm and a tube length of 3,000 mm as shown in FIG. 1, the prepolymer PUP-2 was extruded through a spinning nozzle having 4 holes each having a hole diameter of 0.15 mm at an extrusion line speed Ls of 136 m/min. PUP-2 was then introduced into the tubular path using a reaction solution at 30° C. containing EDA, IPA and toluene in an EDA/(IPA:toluene) molecular ratio of 10/(95:5) and flowing at an average flow speed Vf of 200 m/min, and passed through the tubular path while being shaped into a PUU filament material, which was taken up at a tubular path outlet by a snub roll including 3 rolls at a speed of 800 m/min. The PUU filament material was washed with water, dried, coated with finish oil, taken up at a speed of 880 m/min, and finally wound at a speed of 800 m/min. The resultant PUU fiber had a fineness of 108 denier. Table 5 shows the tensile properties of the fiber in Example 23.

EXAMPLE 24

A PUU fiber of the prepolymer PUP-3 was obtained as explained below.

Using a closed type tubular path having an inside tube diameter of 2.0 mm and a tube length of 3,000 mm as shown in FIG. 1, the prepolymer PUP-3 was extruded through a spinning nozzle having 4 holes each having a hole diameter of 0.15 mm at an extrusion line speed Ls of 136 m/min. PUP-3 was then introduced into the tubular path using a reaction solution at 30° C. containing EDA, IPA and toluene in an EDA/(IPA+toluene)(IPA:toluene) molecular ratio of 7.5/92.5(95:5) and flowing at an average flow speed Vf of 200 m/min, and passed through the tubular path while being shaped into a PUU filament material, which was taken up through a tubular path outlet by a snub roll including 3 rolls at a speed of 800 m/min. The PUU filament material was further continuously washed with water, dried, coated with finish oil, taken up at a speed of 880 m/min, and finally wound up at a speed of 800 m/min. The resultant PUU fiber had a thickness of 108 denier. Table 5 shows tensile properties of the fiber in Example 24. Similarly to Example 23, the PUU fiber was likely to show a high initial stress and a high strength at break as compared with the PUU fiber prepared from PUP-1.

EXAMPLE 25

A PUU fiber of the prepolymer PUP-4 was obtained as explained below.

Using a closed type tubular path having an inside tube diameter of 2.0 mm and a tube length of 3,000 mm as shown in FIG. 1, the prepolymer PUP-4 was extruded through a spinning nozzle having 4 holes each having a hole diameter of 0.15 mm at an extrusion line speed Ls of 136 m/min. PUP-4 was then introduced into the tubular path using a reaction solution at 30° C. containing EDA and IPA in an EDA/IPA molecular ratio of 20/80 and flowing at an average flow speed Vf of 200 m/min, and passed through the tubular path while being shaped into a PUU filament material, which was taken up strength a tubular path outlet by a snub roll including 3 rolls at a speed of 800 m/min. The PUU filament material was further continuously washed with water, dried, coated with finish oil, taken up at a speed of 880 m/min, and finally wound at a speed of 800 m/min. The resultant PUU fiber had a fineness of 108 denier. Table 5 shows tensile properties of the fiber in Example 25. The fiber in Example 25 not only showed a high initial stress, a high strength at break and a high elongation at break but also exhibited a tendency toward becoming a fiber having the three properties in good balance.

TABLE 5

|  | Example 23 | Example 24 | Example 25 |
| --- | --- | --- | --- |
| $\Delta n$ | $5.6 \times 10^{-4}$ | $5.1 \times 10^{-4}$ | $6.0 \times 10^{-4}$ |
| N100 | $1.1 \times 10^{27}$ | $1.3 \times 10^{27}$ | $1.2 \times 10^{27}$ |
| N400 | $1.3 \times 10^{27}$ | $1.4 \times 10^{27}$ | $1.5 \times 10^{27}$ |
| Nt | $3.7 \times 10^{27}$ | $4.1 \times 10^{27}$ | $3.9 \times 10^{27}$ |
| N400/N100 | 1.1 | 1.1 | 1.2 |
| Initial stress at an elongation of 100% (g/d) | 0.092 | 0.102 | 0.097 |
| strength at break (g/d) | 1.48 | 1.53 | 1.58 |
| elongation at break (%) | 781 | 721 | 793 |

INDUSTRIAL APPLICABILITY

Since the PUU continuous shaped article of the present invention has an initial stress, a strength at break and a elongation at break which are sufficiently large, and a small rise of the stress in a medium elongation range, it can provide a fabric having decreased process unevenness, and products exhibit excellent fittingness free of excessive tightening feel during wearing.

Furthermore, the process of the present invention makes it possible to produce PUU continuous shaped articles having thickness in a wide range which even the conventional reaction spinning and the dry spinning process are difficult to produce, at a high spinning speed comparable to that of dry spinning. Moreover, the process of the present invention makes it possible to produce PUU continuous materials having various compositions which the dry spinning and the wet spinning process are difficult to produce; therefore, the process has an extremely high industrial value.

What is claimed is:

1. A polyurethaneurea continuous shaped article having a birefringence index ($\Delta n$) of from at least $1.0 \times 10^{-4}$ to $8.0 \times 10^{-4}$ in a nontensile state, a crosslinking point density at an elongation of 100% (N100) of at least $5.0 \times 10^{26}/m^3$, a crosslinking point density at an elongation of 400% (N400) of from $4.0 \times 10^{26}$ to $3.0 \times 10^{27}/m^3$, and a crosslinking density at the time of break (Nt) of at least $1.6 \times 10^{27}/m^3$, wherein the ratio of the crosslinking density at an elongation of 400% to that at an elongation of 100% (N400/N100) is from 0.9 to 1.3.

2. A process for producing a polyurethaneurea continuous shaped article comprising extruding from a shaping nozzle a liquid polyurethane prepolymer having isocyanate groups at at least two molecular ends at an extrusion line speed of Ls, introducing the extruded polyurethane prepolymer into a flowing bath composed of a polyamine-containing reaction solution flowing at an average flowing speed Vf in the traveling direction thereof under the condition of Ls≦Vf, whereby the chain of the polyurethane prepolymer is extended by the reaction of the isocyanate groups with the polyamine in the flowing bath and a solidified polyurethaneurea is produced, and taking up the polyurethaneurea at a speed of Vt which is at least Vf or more.

3. The process for producing a polyurethaneurea continuous shaped article according to claim 2, wherein the polyurethaneurea is taken up the flowing bath at a take-up speed Vt1, and it is taken up at a take-up speed Vt (wherein Vt≦1.5Vt1).

4. The process for producing a polyurethaneurea continuous shaped article according to claim 2, wherein the polyurethaneurea is taken up through the flowing bath at a take-up speed Vt1, and it is taken up at a take-up speed Vt (wherein Vt>1.5Vt1).

5. The process for producing a polyurethaneurea continuous shaped article according to claim 2, wherein the polyurethane prepolymer is extruded through a shaping nozzle, the extruded polyurethane prepolymer is introduced into a tubular path filled with a polyamine-containing solution flowing in the traveling direction of the polyurethane prepolymer in a closed state, the chain of the polyurethane prepolymer is extended therein, and the resultant polyurethaneurea continuous shaped article is released into a gas atmosphere.

6. The process for producing a polyurethaneurea continuous shaped article according to claim 2, wherein the polyurethane prepolymer having been extruded through a shaping nozzle is passed through a gas atmosphere once, the extruded polyurethane prepolymer is then introduced into a tubular path filled with a polyamine-containing solution flowing in the traveling direction of the polyurethane prepolymer, the chain of the polyurethane prepolymer is extended therein, and the resultant polyurethaneurea continuous shaped article is released into a gas atmosphere.

* * * * *